(12) United States Patent
Yoon et al.

(10) Patent No.: US 7,599,716 B2
(45) Date of Patent: Oct. 6, 2009

(54) METHOD FOR PROCESSING DATA IN MOBILE COMMUNICATION TERMINAL

(75) Inventors: Woo-Sun Yoon, Gumi-si (KR); Dong-Wook Kwon, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 679 days.

(21) Appl. No.: 11/166,186

(22) Filed: Jun. 27, 2005

(65) Prior Publication Data

US 2006/0148529 A1 Jul. 6, 2006

(30) Foreign Application Priority Data

Jan. 3, 2005 (KR) ............. 2005-0000107

(51) Int. Cl.
*H04M 1/00* (2006.01)
(52) U.S. Cl. ............... 455/566; 455/407; 455/414.1; 455/418; 455/556.1; 455/575.3; 345/169; 345/543; 345/553
(58) Field of Classification Search ............... 455/566, 455/407, 414.1, 418, 556.1, 575.3; 345/169, 345/543, 553
See application file for complete search history.

(56) References Cited

U.S. PATENT DOCUMENTS 6,947,763 B2 * 9/2005 Katada .................... 455/550.1
7,231,229 B1 * 6/2007 Hawkins et al. ............. 455/564
2006/0030369 A1 * 2/2006 Yang ......................... 455/566

FOREIGN PATENT DOCUMENTS

JP    2004040624    2/2004
KR    2002-19132    3/2002

* cited by examiner

*Primary Examiner*—Matthew D Anderson
*Assistant Examiner*—Shaima Q Aminzay
(74) *Attorney, Agent, or Firm*—Roylance, Abrams, Berdo & Goodman, L.L.P.

(57) ABSTRACT

A method is provided for processing data in a mobile communication terminal including a first data memory for storing first data indicating user-stored information and a second data memory for storing second data indicating user-stored information. The method includes creating a first data list corresponding to the first data and a second data list corresponding to the second data and displaying items of the first data list and items of the second data list on a screen of the mobile communication terminal in response to a user's data movement request, selecting at least one item from one that is selected from the first data list and the second data list that are separately displayed based on user's selection information, and storing data of the selected item in the first data memory or the second data memory into the other memory if a predetermined key is input.

19 Claims, 9 Drawing Sheets

METHOD FOR PROCESSING DATA IN MOBILE COMMUNICATION TERMINAL

PRIORITY

This application claims the benefit under 35 U.S.C. §119 (a) of an application entitled "Method for Processing Data in Mobile Communication Terminal" filed in the Korean Intellectual Property Office on Jan. 3, 2005 and assigned Ser. No. 2005-107, the entire contents of which are hereby incorporated by reference.

BACKGROUND OF THE INVENTION

1. Field of the Invention

The present invention generally relates to a mobile communication terminal. In particular, the present invention relates to a method for processing (or handling) data in a mobile communication terminal including a first data memory, such as an internal memory, for storing first data indicating user-stored information and a second data memory, such as an external memory, for storing second data indicating user-stored information.

2. Description of the Related Art

Generally, a mobile communication terminal is a device that provides a user with communication functions which allow the user to have conversations or exchange data during a user's travel, such as a cellular phone, a Personal Digital Assistant (PDA), a Personal Communication Service (PCS) phone, an International Mobile Telecommunication-2000 (IMT-2000) terminal, and a Global System for Mobile communication (GSM) terminal.

Such a mobile communication terminal has come into wide use all over the world and there is now a growing recognition that a mobile communication terminal is a necessity. As a result, a mobile communication terminal tends to be miniaturized, slimmer, and light-weight to make it easy for users to carry and is evolving into a multimedia terminal that can provide a variety of functions. In particular, the future mobile communication terminals will be miniaturized further, have multiple functions and purposes, and will be adaptable to various multimedia environments or Internet environments.

The mobile communication terminal was originally intended for phone conversations, but now provides a short message transmission and reception function, a memory function for storing and searching for phone numbers, a locking function, an alarm function, an area code check function. Recently added functions include a camera function, a digital broadcast reception function, and a game function.

Such a mobile communication terminal must often process bulk data for multimedia services and various additional function services. To this end, a large-capacity memory is required. However, since the capacity of a memory included in a mobile communication terminal is limited, an additional external memory, such as a multimedia card or a universal serial bus (USB) keycard, is generally added to the mobile communication terminal. The multimedia card is a high-capacity memory card and has been widely used as a storage medium of a mobile communication terminal, a digital camera, and an MP3.

However, in a mobile communication terminal having an internal memory and an external memory, when data is moved from one of the two memories to another for storage or is deleted from one of the two memories, all of the target data should be confirmed before being processed.

Moreover, in a mobile communication terminal, to delete user-stored information, such as phone book data, from a data memory, all corresponding data may be individually deleted or the entire data file may be deleted on a collective basis. The individual data deletion requires much time and the collective data deletion may even delete the data that the user desires not to delete.

SUMMARY OF THE INVENTION

It is, therefore, an object of the present invention to provide a method for efficiently processing data in a mobile communication terminal.

It is another object of the present invention to provide a method for simply processing data between a first data memory for storing first data and a second data memory for storing second data in a mobile communication terminal including the first data memory and the second data memory.

It is still another object of the present invention to provide a method for efficiently deleting data stored in a data memory of a mobile communication terminal including at least one data memory.

To achieve the above and other objects, there is provided a method for processing data in a mobile communication terminal comprises a first data memory for storing first data indicating user-stored information and a second data memory for storing second data indicating user-stored information. The method comprises the steps of creating a first data list corresponding to the first data and a second data list corresponding to the second data and displaying items of the first data list and items of the second data list on a screen of the mobile communication terminal in response to a user's data movement request, selecting at least one item from one that is selected from the first data list and the second data list that are separately displayed based on user's selection information, and storing data of the selected item in the first data memory or the second data memory for storing data that is not selected if a predetermined key is input.

To achieve the above and other objects, there is also provided a method for processing data in a mobile communication terminal including at least one data memory. The method comprises the steps of creating a data list corresponding to data stored in a data memory and displaying items of the created data list on a screen of the mobile communication terminal in response to a user's data movement request, selecting at least one item from the displayed data list based on user's selection information, and deleting data of the selected item if a predetermined key is input.

BRIEF DESCRIPTION OF THE DRAWINGS

The above and other objects, features and advantages of the present invention will become more apparent from the following detailed description when taken in conjunction with the accompanying drawings in which.

It should be understood that like reference numbers refer to like features, structures, and elements throughout the drawings.

DETAILED DESCRIPTION OF EXEMPLARY EMBODIMENTS

Exemplary embodiments of the present invention will now be described in detail with reference to the annexed drawings. In the following description, a detailed description of known functions and configurations incorporated herein has been omitted for the sake of conciseness.

Figure 1:
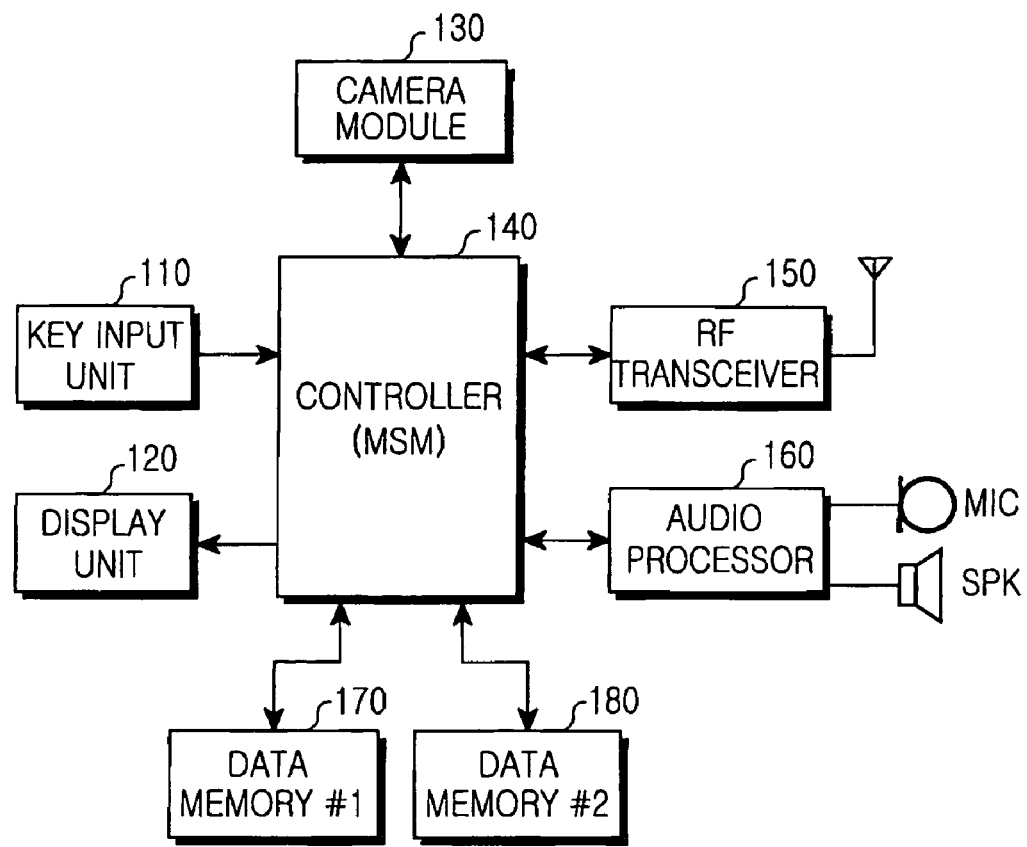
FIG. 1 is a block diagram of a mobile communication terminal according to an embodiment of the present invention.

FIG. 1 is a block diagram of a mobile communication terminal according to an embodiment of the present invention.

A mobile communication terminal comprises a key input unit 110, a display unit 120, a camera module 130, a controller (MSM) 140, a radio frequency (RF) transceiver 150, an audio processor 160, a first data memory 170, and a second data memory 180.

The key input unit 110 has a key matrix structure (not shown) and preferably includes character keys, number keys, direction keys, function keys, and external volume keys to output a key input signal corresponding to a key input by a user to the controller 140.

The display unit 120 may use a liquid crystal display (LCD) to output various display data generated in the mobile communication terminal. In this case, it is preferable that the display unit 120 includes an LCD controller, a memory that can store video data, and an LCD display element.

The display unit 120 outputs various information received by the RF transceiver 150 and displays video signals output from a video processor (not shown) and user data output from the controller 140.

When the LCD is implemented with a touch screen, the display unit 120 may also serve as an input unit.

The camera module 130 includes a camera sensor (not shown) for converting optical signals sensed during photographing into electric signals and a signal processor (not shown) for converting analog signals photographed by the camera sensor into digital data.

Herein, the camera sensor is assumed to be a charge coupled device (CCD) sensor, and the signal processor can be implemented with a digital signal processor (DSP). The camera sensor and the signal processor can be implemented into either one body or can be separately implemented.

The controller 140 controls the overall operations of the mobile communication terminal according to an embodiment of the present invention. The controller 140 switches and controls the operation modes of the mobile communication terminal based on various key input signals provided by the key input unit 110.

The RF transceiver 150 includes a high frequency processor, an intermediate frequency processor, and a baseband frequency processor.

The RF transceiver 150 transmits and receives audio data, character data, video data, and control data under the control of the controller 140.

The audio processor 160 modulates an electric signal input from a microphone to convert the modulated electric signal into audio data and demodulates encoded audio data input from the RF transceiver 150 into an electric signal to output the electric signal to a speaker SPK.

It is preferable that the audio processor 160 includes a codec for converting a digital audio signal received from the RF transceiver 150 into an analog audio signal and reproducing the analog signal or converting an analog audio signal generated from a microphone MIC into a digital audio signal. The codec preferably includes a data codec for processing packet data and an audio codec for processing audio signals like voice. The codec may be separately equipped or included in the controller 140.

A memory of the mobile communication terminal according to an embodiment of the present invention includes the first data memory 170 and the second data memory 180.

The first data memory 170 can be comprised of program memories and data memories to store various information for controlling the operation of the mobile communication terminal according to an embodiment of the present invention. When the first data memory 170 is an internal memory, it may be built in the mobile communication terminal.

The first data memory 170 stores a variety of information selected based on user's selection information and first data indicating user-stored information, in other words, information stored by a user, and the first data preferably includes a user's memo records, a call record list, a phone directory, transmitted and or received messages, picture data, and music data.

If the second data memory 180 is an external memory, such as a multimedia card, it can be inserted into or extracted from the mobile communication terminal. The second data memory 180 stores second data that preferably includes a user's memo records, a call record list, a phone directory, transmitted and or received messages, picture data, and music data, which are types of data similar to the first data. When the second data memory 180 is inserted into the mobile communication terminal, a user of the mobile communication terminal can use various data stored in the second data memory 180 and store predetermined data in the second data memory 180.

Herein, the first data memory 170 and the second data memory 180 may be assumed to be an internal memory and an external memory, respectively. However, two areas partitioned from a single memory may serve as the first data memory 170 and the second data memory 180, respectively.

Figure 2:
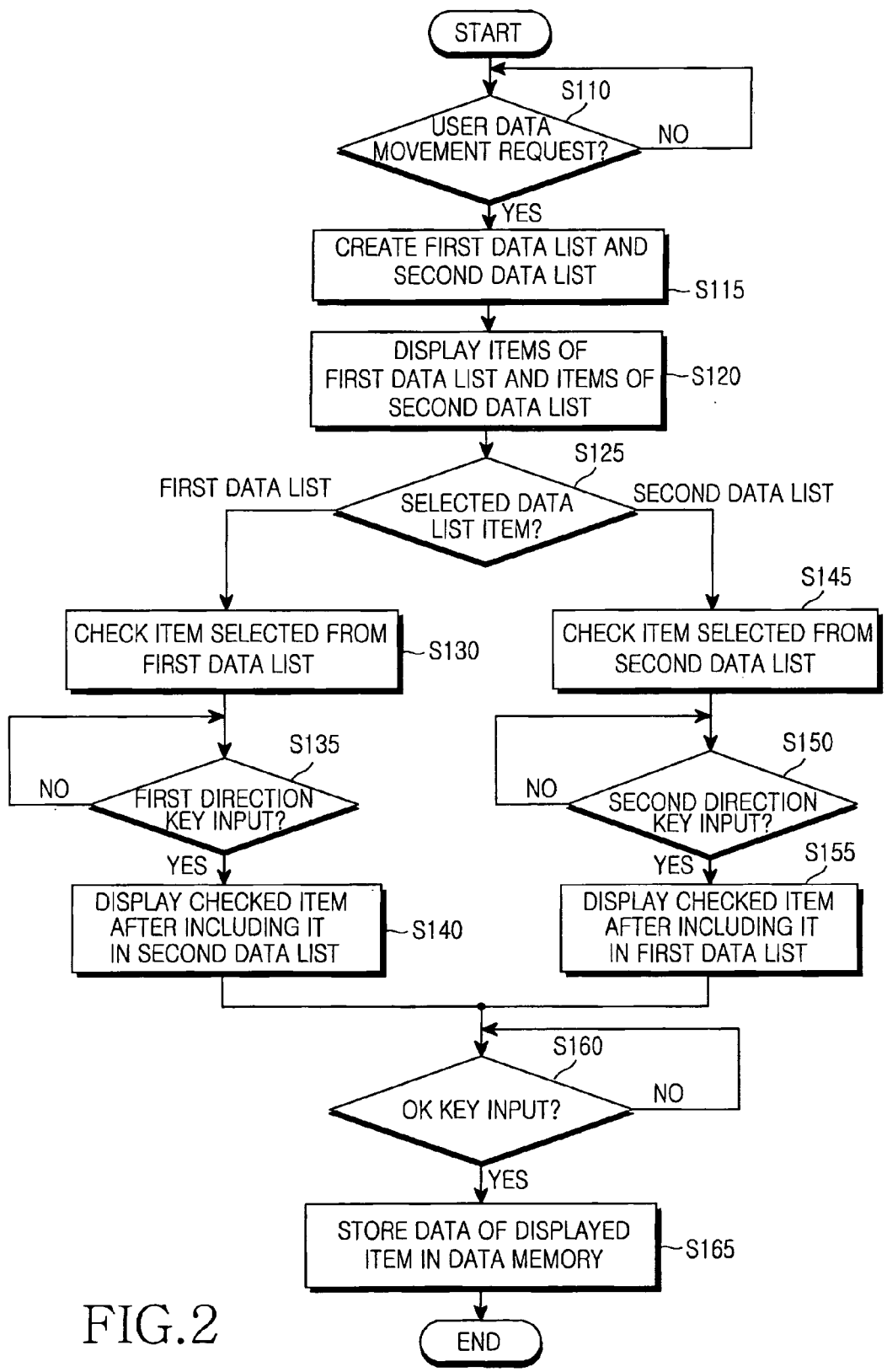
FIG. 2 is a flowchart illustrating a data processing process of a mobile communication terminal according to an embodiment of the present invention.

FIG. 2 is a flowchart illustrating a data processing process of a mobile communication terminal according to an embodiment of the present invention.

Referring to FIGS. 1 and 2, the controller 140 determines if a data movement request is input from the user in step S110. The data movement request is input preferably using a menu key, but may be input by voice.

If the data movement request is input, the controller 140 creates a first data list corresponding to the first data stored in the first data memory 170 and a second data list corresponding to the second data stored in the second data memory 180 in step S115. The first data or the second data whose corresponding list is to be created may be one of a user's memo records, call record list, phone directory, transmitted and or received messages, picture data, or music data and is preferably data selected by the user's data movement request.

In other words, if the user's phone directory is the data selected by the user's data movement request, the controller 140 creates the user's phone directory lists corresponding to the user's phone directories stored in the first data memory 170 and the second data memory 180.

When creating the first data list and the second data list, the controller 140 preferably creates a first display window and a second display window on which the created lists are to be displayed at predetermined areas on a screen of the mobile communication terminal, such as a screen of the display unit 120. Preferably, the first display window and the second display window are created on the left side and the right side of the screen of the display unit 120, respectively.

The controller 140 controls the display of items of the first data list and the second data list on the first display window and the second display window of the display unit 120, respectively, in step S120.

The controller 140 determines from which list between the first data list displayed on the first display window and the second data list displayed on the second display window an item is selected according to the user's selection information, usually performed by a key input, in step S125. At this time, the user can select at least one item from the first data list or the second data list.

If it is determined that the item is selected from the first data list according to the user's selection information in step S125, the controller 140 flags the item selected from the first data list in step S130 to allow the user to recognize the selected item. To this end, it is preferable that the controller 140 adds selection flags or some other indicator, such as highlighting or checkmarks, in front of items of the first data list and the second data list at the time of creating the first data list and the second data list. In this case, whenever the user selects a predetermined item, the controller 140 may flag the selected item by marking a selection flag added in front of the selected item.

If a predetermined key, such as a first direction key, is input after the user selects an item from the first data list, the controller 140 displays the flagged item on the second display window in step S140. In other words, the controller 140 displays the flagged item after including it in the second data list. Alternatively, if the predetermined key is input after the item is selected from the first data list, the controller 140 may control the flagged item to be immediately stored in the second data memory 180.

The predetermined key is preset for moving data of an item selected based on the user's selection information. In an embodiment of the present invention, direction keys indicating four directions (up, down, left, and right) from among keys included in the key input unit 110 correspond to the predetermined key. In addition, in an embodiment of the present invention, it is assumed that a first direction indicates a left-to-right direction and a second direction indicates a right-to-left direction. Thus, it is preferable that a first direction key is set as a right direction key and a second direction key is set as a left direction key.

Once the first direction key, for instance, the right direction key, is input in step S140, the controller 140 displays the flagged item after moving the flagged item to the second display window created on the right side of the screen of the display unit 120.

The controller 140 determines if an OK key is input in step S160, and stores the data of the item displayed on the second display window in the second data memory 180 in step S165 if the OK key is input. At this time, after storing data of the item displayed on the second display window in the second data memory 180, the controller 140 may delete data of the item selected from the first data list from the first data memory 170 at a user's data deletion request.

If it is determined in step S125 that the item is selected from the second data list according to the user's selection information, the controller 140 flags the item selected from the second data list in step S145. At this time, whenever the user selects a predetermined item, the controller 140 may flag the selected item by marking a selection flag added in front of the selected item.

If a predetermined key, such as the second direction key, is input after the user selects an item from the second data list, the controller 140 displays the flagged item on the first display window in step S150. In other words, the controller 140 displays the flagged item after including it in the first data list.

The controller 140 determines if the OK key is input in step S160 and stores the data of the item displayed on the first display window in the first data memory 170 in step S165 if the OK key is input. At this time, after storing the data displayed on the first display window in the first data memory 170, the controller 140 may delete the data of the item selected from the second data list from the second data memory 180 at the user's data deletion request.

Figure 3:
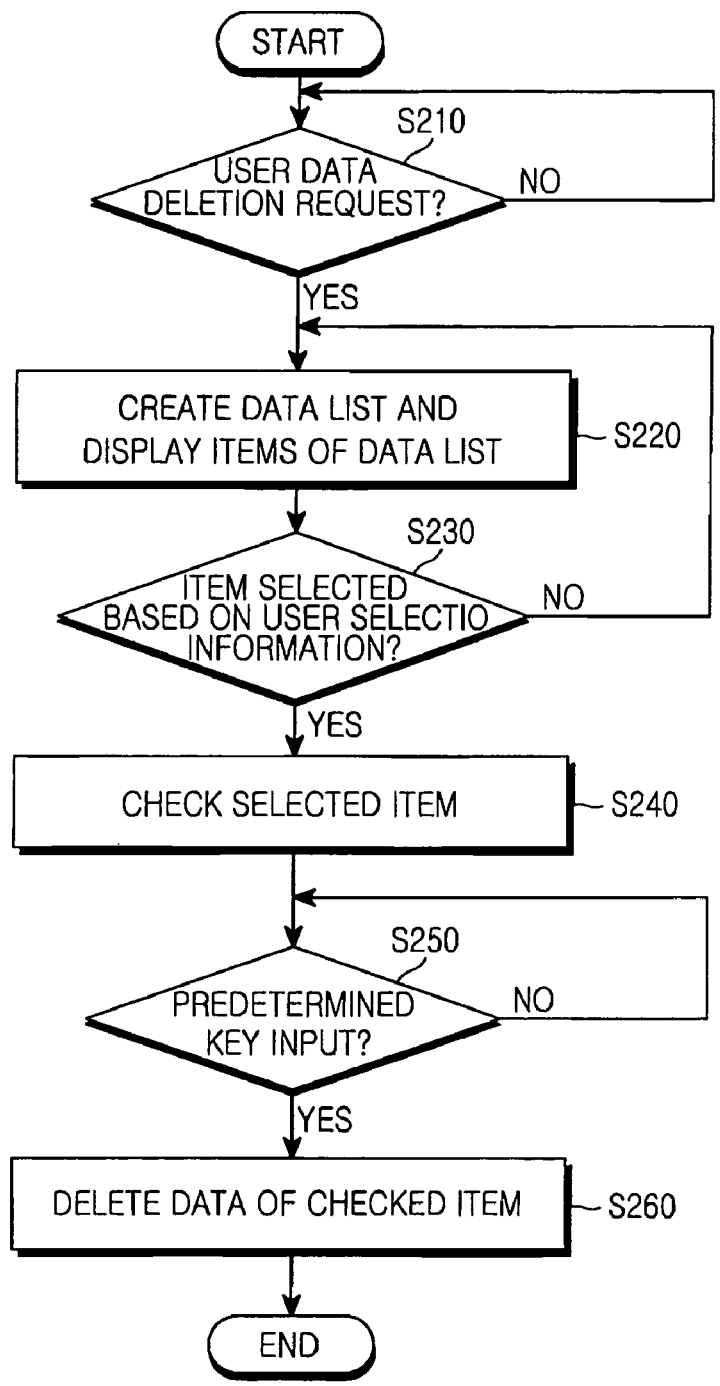
FIG. 3 is a flowchart illustrating a data deletion process of a mobile communication terminal according to an embodiment of the present invention.

FIG. 3 is a flowchart illustrating a data deletion process of a mobile communication terminal according to an embodiment of the present invention.

Referring to FIGS. 1 and 3, the controller 140 determines if the user's data deletion request, which can be input using a menu key, for example, is input in step S210.

If the user's data deletion request is input, the controller 140 creates a data list corresponding to data stored in a data memory, such as the first data memory 170 or the second data memory 180, and displays the items from the data list in step S220. The data whose corresponding list is to be created may be one of a user's memo records, a call record list, a phone directory, transmitted and or received messages, picture data, and music data and the user can select the data whose corresponding list is to be created.

The controller 140 determines if an item is selected from the data list displayed based on a user's selection information by using a key input, for instance, in step S230. At this time, the user can select at least one item from the displayed data list.

If an item is selected from the data list, the controller 140 flags the selected item to allow the user to recognize the selected item in step S240. To this end, the controller 140 may add selection flags in front of the items of the data list at the time of creating the data list. In this case, whenever the user selects a predetermined item, the controller 140 may flag the selected item by marking a selection flag added in front of the selected item.

The controller 140 determines if a predetermined key, such as an OK key, which is preset for deletion of data of the selected item, is input in step S250 after the item selected by the user is flagged.

If the predetermined key is input, the controller 140 deletes the data of the flagged item from a corresponding data memory in step S260.

The user can selectively delete at least one of items from a predetermined data list through the data deletion process shown in FIG. 3.

Figure 4:
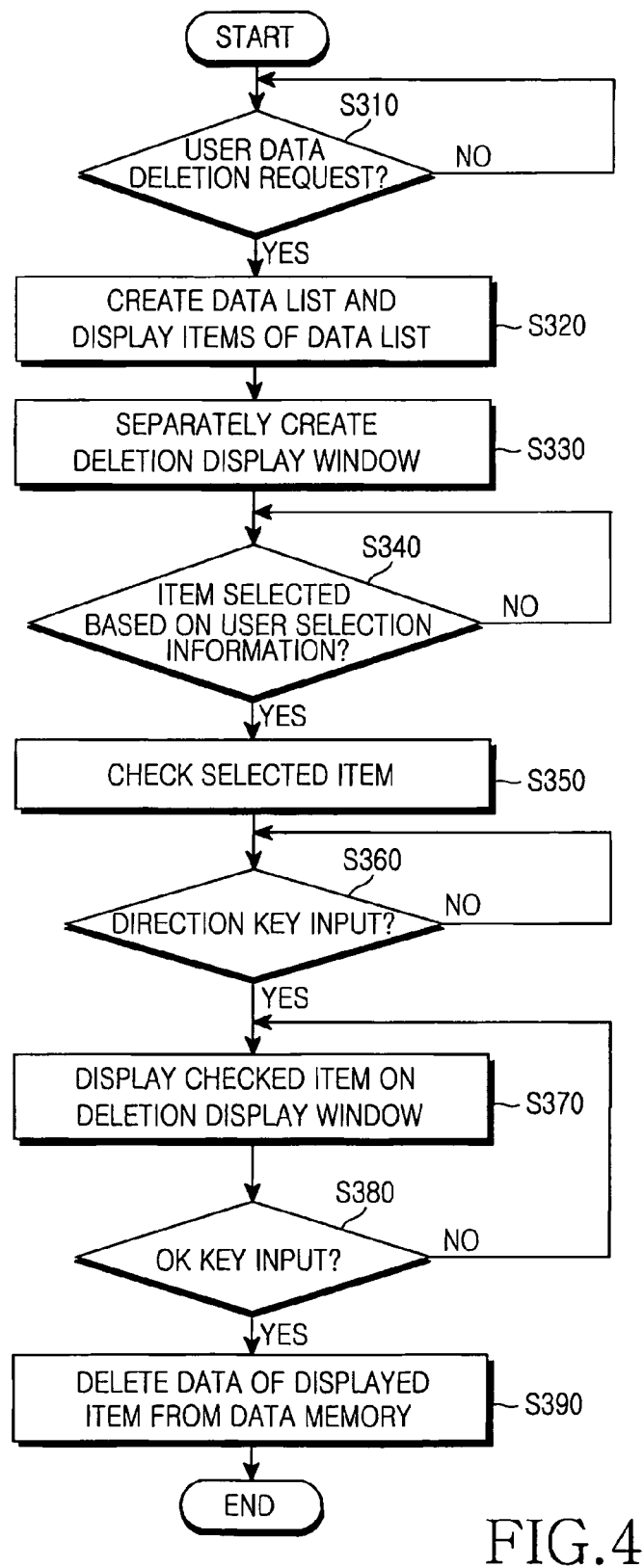
FIG. 4 is a flowchart illustrating a data deletion process of a mobile communication terminal according to an embodiment of the present invention.

FIG. 4 is a flowchart illustrating a data deletion process of a mobile communication terminal according to an embodiment of the present invention.

Referring to FIGS. 1 and 4, in step S310, the controller 140 determines if the user's data deletion request is input.

If the user's data deletion request is input, the controller 140 creates a data list corresponding to data, such as the phone directory, stored in a data memory, such as the first data memory 170 or the second data memory 180, and displays items on the created data list in step S320. The user can select data whose corresponding list is to be created.

The controller 140 separately creates a deletion display window for displaying items of a data list that are to be deleted on the screen of the display unit 120 based on the user's data deletion request in step S330. At this time, for the user's convenience, it is preferable that the items in the data list to be deleted are displayed on the left side of the screen of the display unit 120 and the deletion display window is created on the right side of the screen of the display unit 120.

The controller 140 determines if an item is selected from the data list displayed based on the user's selection information through a key or voice input, for example, in step S340. At this time, the user can select at least one item from the displayed data list.

If an item is selected from the data list, the controller 140 flags the selected item to allow the user to recognize the selected item in step S350.

The controller 140 determines if a direction key, the right direction key, for instance, is input in step S360 after the item selected by the user is flagged.

If the right direction key is input, the controller 140 moves the flagged item to a separately created deletion display window and displays the flagged item on the deletion display window in step S370. Through step S370, the user can flag items in the data list to be deleted by the user through the deletion display window.

The controller 140 determines if a predetermined key, such as the OK key, which is preset for data deletion, is input in step S380. If the predetermined key is input, the controller 140 deletes the data of the items displayed on the deletion display window from a data memory in step S390.

The controller 140 may move the flagged item to the deletion display window and display the flagged item on the deletion display window through the input of a direction key (step S370) and without the input of the OK key (step S390) and delete the data of the flagged item from a data memory.

FIGS. 5A through 5D are views for explaining a data processing process of a mobile communication terminal according to an embodiment of the present invention. The mobile communication terminal to be described with reference to FIGS. 5A through 5D is assumed to include a first data memory for storing first data indicating user-stored information and a second data memory for storing second data indicating user-stored information. FIGS. 5A through 5D will be described with reference to FIG. 1.

Figure 5A:
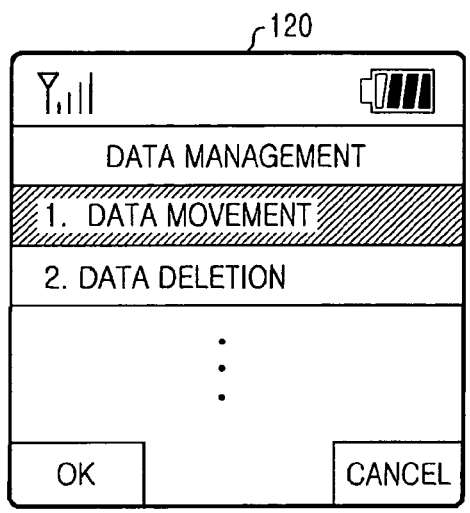
FIGS. 5A through 5D are views for explaining a data processing process of a mobile communication terminal according to an embodiment of the present invention.
Figure 5B:
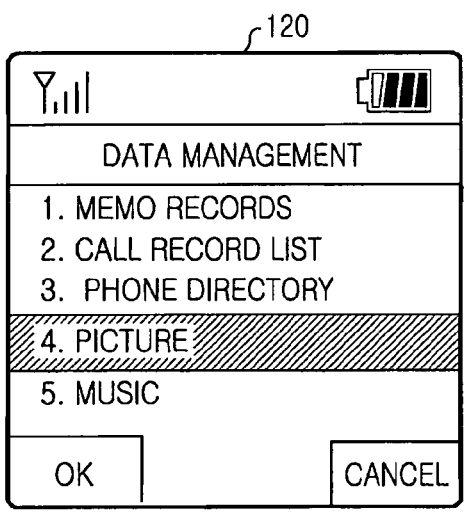

FIG. 5A illustrates a menu for data movement or data deletion on the screen of the display unit 120 at a user's request. Once the menu item "1. data movement" is selected and the OK key is input by a user's key manipulation in FIG. 5A, the mobile communication terminal displays the types of data indicating user-stored information on the screen of the display unit 120 as shown in FIG. 5B. The user-stored information preferably includes the data types "1. memo records", "2. call record list", "3. phone directory", "4. picture", and "5. music".

Figure 5C:
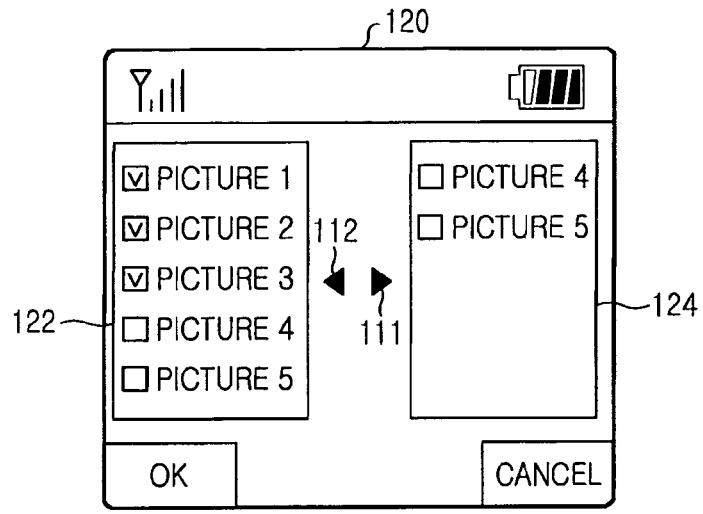

If the OK key is input after "4. picture" is selected from among the data indicating the user-stored information, the mobile communication terminal displays a screen shown in FIG. 5C. In other words, the mobile communication terminal creates a data list corresponding to picture data as selected from among the types of data stored in the first data memory 170 and displays items in the created data list on a first display window 122 created on the left side of the screen of the display unit 120, and creates a data list corresponding to picture data among the types of data stored in the second data memory 180 and displays items in the created data list on a second display window 124 created on the right side of the screen of the display unit 120. At this time, the first data memory 170 may be an internal memory and the second data memory 180 may be an external memory.

The items displayed on the first display window 122 of FIG. 5C are "Picture 1", "Picture 2", "Picture 3", "Picture 4", and "Picture 5", and the items displayed on the second display window 124 of FIG. 5C are "Picture 4" and "Picture 5". In FIG. 5C, selection flags are added in front of the items selected based on a users' selection request and are displayed in the first display window 122 and the second display window 124. Thus, it can be seen from FIG. 5C that items "Picture 1", "Picture 2" and "Picture 3" among items of picture data displayed on the first display window 122 are flagged according to a user's key manipulation.

Figure 5D:
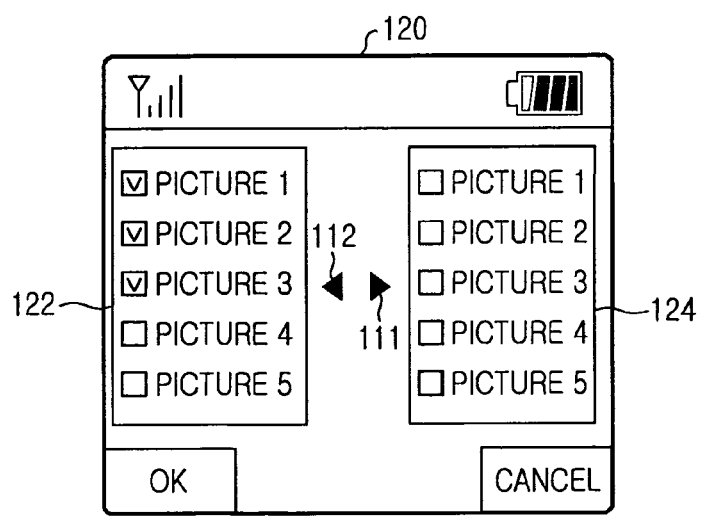

Once a right direction key 111, preferably, is input after the items "Picture 1", "Picture 2" and "Picture 3" selected by the user are flagged, the mobile communication terminal displays a screen in which the items "Picture 1", "Picture 2" and "Picture 3" are displayed in the second display window 124, as shown in FIG. 5D. Once the user verifies the selections on the screen and inputs the OK key, the mobile communication terminal stores data of the items "Picture 1", "Picture 2" and "Picture 3" displayed in the second display window 124 in the second data memory 180.

After storing the data of the items "Picture 1", "Picture 2" and "Picture 3" displayed in the second display window 124 in the second data memory 180, the mobile communication terminal may delete the data of the flagged items "Picture 1", "Picture 2" and "Picture 3" from among the items "Picture 1", "Picture 2", "Picture 3", "Picture 4", and "Picture 5" displayed in the first display window 122 from the first data memory 170 upon the input of a user's data deletion request.

FIGS. 6A through 6F are views for explaining a data deletion process of a mobile communication terminal according to an embodiment of the present invention. The mobile communication terminal to be described with reference to FIGS. 6A through 6F is assumed to include at least one data memory. FIGS. 6A through 6F will be described with reference to FIG. 1

Figure 6A:
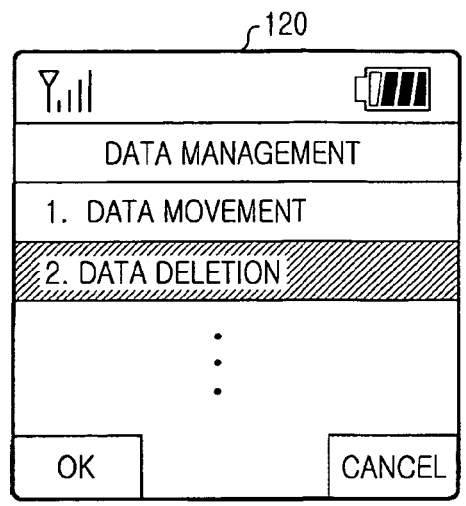
FIGS. 6A through 6F are views for explaining a data deletion process of a mobile communication terminal according to an embodiment of the present invention.
Figure 6B:
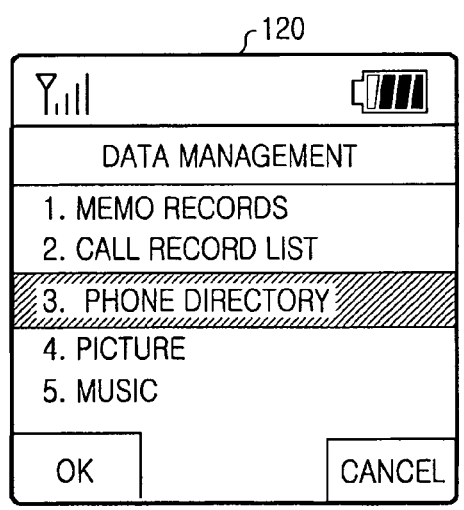

FIG. 6A illustrates a menu for data movement or data deletion on the screen of the display unit 120 at a user's request. Once menu item "2. data deletion" is selected and the OK key is input by a user's key manipulation in FIG. 6A, the mobile communication terminal displays the types of data indicating user-stored information on the screen of the display unit 120 as shown in FIG. 6B. The user-stored information preferably includes the data types: "1. memo records", "2. call record list", "3. phone directory", "4. picture", and "5. music".

Figure 6C:
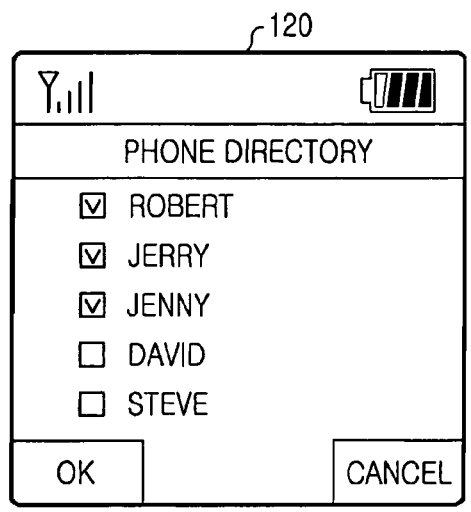

If the OK key is input after the data type "3. phone directory" is selected from among the data indicating the user-stored information, the mobile communication terminal displays a phone directory as shown in FIG. 6C.

In FIG. 6C, three items, "Robert", "Jerry", and "Jenny", are selected from among the displayed items, "Robert", "Jerry", "Jenny", "David", and "Steve", of the phone directory through user's key manipulation. Selection flags are added in front of the displayed items to allow the items selected based on user's selection to be flagged.

Figure 6D:
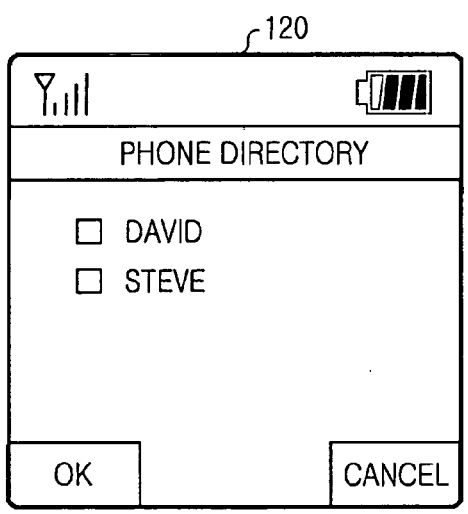

Once a predetermined key, such as the OK key, which is preset for data deletion, is input after the three items, "Robert", "Jerry", and "Jenny", are flagged as shown in FIG. 6C, the mobile communication terminal deletes the data of the flagged items from a corresponding data memory and then displays a screen in which only the items "David" and "Steve" are displayed, as shown in FIG. 6D.

Figure 6E:
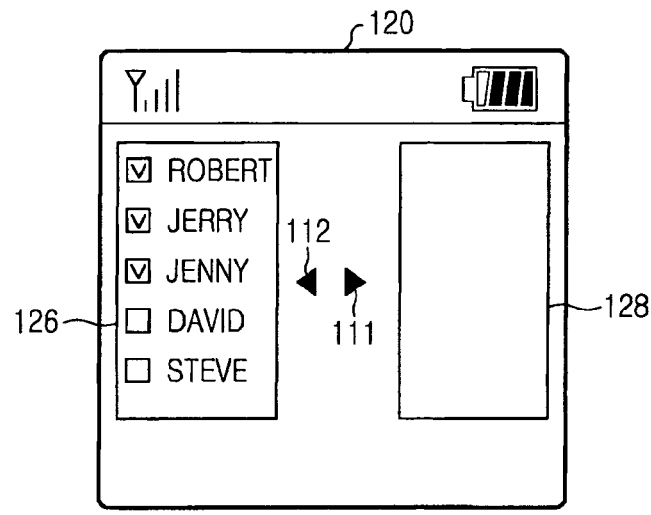

According to another embodiment of the present invention, the mobile communication terminal may display a screen as shown in FIG. 6E, if the data type "3. phone directory" is selected and the OK key is input in FIG. 6B.

In FIG. 6E, the mobile communication terminal displays items of the phone directory on a display window 126 created on the left side of the screen of the display unit 120 and separately creates a deletion display window 128 for displaying items of a data list to be created on the right side of the screen of the display unit 120. Once the right direction key 111 is input after flagging the items "Robert", "Jerry", and "Jenny" selected through user's key manipulation among the displayed items of the phone directory, "Robert", "Jerry", "Jenny", "David", and "Steve", displayed in the display window 126, the mobile communication terminal moves the flagged items to a separately created deletion display window 128 and displays the flagged items on the deletion display window 128. Thus, the user can verify flag items of a data list to be deleted by the user through the deletion display window 128 prior to the items being deleted.

Figure 6F:
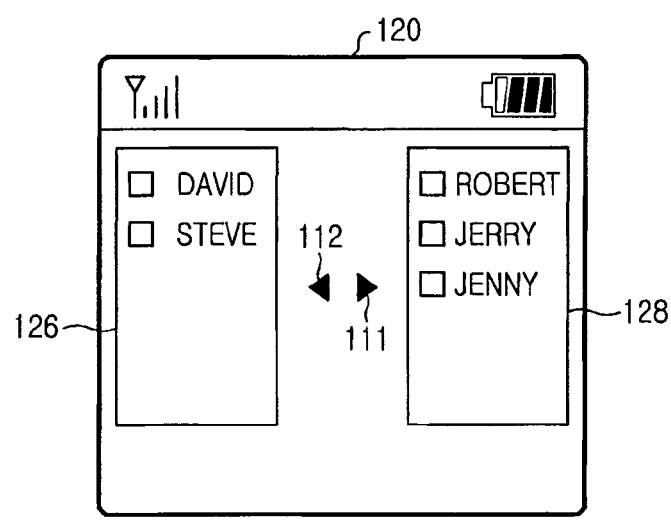

Once the OK key is input, the mobile communication terminal displays a screen in which the items displayed in the deletion display window 128 are deleted from a corresponding data memory, as shown in FIG. 6F.

As described above, according to embodiments of the present invention, it is possible to simply move desired first data or second data to a desired first data memory or second data memory and store the desired data in the desired data memory or delete the desired data from the desired data memory in a mobile communication terminal comprising the first data memory for storing the first data and the second data memory for storing the second data.

In addition, according to embodiments of the present invention, it is possible to efficiently process data of a mobile communication terminal by deleting data stored in a memory of the mobile communication terminal according to a user's selection.

While the invention has been shown and described with reference to certain preferred embodiments thereof, it will be understood by those skilled in the art that various changes in form and details may be made therein without departing from the spirit and scope of the invention.

What is claimed is:

1. A method for processing data in a mobile communication terminal including a first data memory for storing first data indicating user-stored information and a second data memory for storing second data indicating user-stored information, the method comprising the steps of:
    creating a first data list corresponding to the first data and a second data list corresponding to the second data and displaying items of the first data list and items of the second data list on a screen of the mobile communication terminal in response to a user's data movement request;
    selecting at least one item from one that is selected from the first data list and the second data list that are separately displayed based on user's selection information; and
    storing data of the selected items in either the first data memory or the second data memory, in whichever memory the selected items are not currently stored, if a predetermined key is input;
    wherein the step of displaying the items of the first data list and the items of the second data list further comprises the step of separately creating a first display window for displaying the created first data list on a predetermined area of the screen of the mobile communication terminal and a second display window for displaying the created second data list on another predetermined area of the screen of the mobile communication terminal.

2. The method of claim 1, wherein the storing step comprises the step of storing, if the selected items belong to the first data list, the data in the second data memory, and if the selected items belong to the second data list, storing the data in the first data memory.

3. The method of claim 1, wherein the first data or the second data is one of a user's memo records, call record list, phone directory, transmitted and or received messages, picture data, and music data.

4. The method of claim 1, wherein the first data memory is an internal memory and the second data memory is an external memory.

5. The method of claim 1, wherein the predetermined key is preset for movement of data of the item selected based on the user's selection information.

6. The method of claim 5, wherein the predetermined key is one of up, down, left, and right direction keys included in a keypad of the mobile communication terminal.

7. The method of claim 1, wherein the storing step comprises steps of:
    displaying the selected items on the second display window if a first direction key is input when the selected items belong to the first data list displayed on the first display window; and
    storing the data of the items displayed on the second display window in the second data memory if an OK key is input.

8. The method of claim 7, wherein the selected items are indicated as being selected in the display window by being highlighted or by having a checkmark adjacent to the selected item.

9. The method of claim 7, wherein the first direction key is the right direction key.

10. The method of claim 7, wherein the storing step further comprises the step of storing the data of the items displayed on the second display window in the second data memory and deleting the data of the selected items from the first data memory at a user's data deletion request.

11. The method of claim 1, wherein the storing step comprises the steps of:
    displaying the selected items on the first display window if a second direction key is input when the selected items belong to the second data list displayed on the second display window; and
    storing the data of the items displayed on the first display window in the first data memory if the OK key is input.

12. The method of claim 11, wherein the second direction key is the left direction key.

13. The method of claim 11, wherein the storing step further comprises the step of storing the data of the items displayed on the first display window in the first data memory and deleting the data of the selected items from the second data memory at a user's data deletion request.

14. A method for processing data in a mobile communication terminal including at least one data memory, the method comprising the steps of:
    creating a data list corresponding to data stored in a data memory and displaying items of the created data list on a screen of the mobile communication terminal in response to a user's data movement request;
    selecting a plurality of items from the displayed data list based on user's selection information; and
    deleting data of the selected items if a predetermined key is input;
    wherein the step of displaying items of the created data list further comprises the step of separately creating a deletion display window for displaying items of the data list to be deleted in response to a user's request on the screen of the mobile communication terminal.

15. The method of claim 14, wherein the predetermined key is preset for deletion of the data of the items selected based on the user's selection information.

16. The method of claim 15, wherein the predetermined key is an OK key.

17. The method of claim 15, wherein the predetermined key is one of up, down, left, and right direction keys included in a keypad of the mobile communication terminal.

18. The method of claim 14, wherein the deletion step comprises the steps of:

displaying the data list including the selected items on the deletion display window if a direction key is input after at least one of the items of the displayed data list is selected; and deleting the data of the selected items from the data memory if the predetermined key is input after the data list including the selected items are displayed on the deletion display window.

19. The method of claim 14, wherein the data is one of a user's memo records, call record list, phone directory, transmitted and or received messages, picture data, and music data.

* * * * *

UNITED STATES PATENT AND TRADEMARK OFFICE
CERTIFICATE OF CORRECTION

PATENT NO. : 7,599,716 B2  Page 1 of 1
APPLICATION NO. : 11/166186
DATED : October 6, 2009
INVENTOR(S) : Yoon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 918 days.

Signed and Sealed this

Twenty-eighth Day of September, 2010

David J. Kappos
*Director of the United States Patent and Trademark Office*